US007835966B2

(12) United States Patent
Satchwell

(10) Patent No.: US 7,835,966 B2
(45) Date of Patent: *Nov. 16, 2010

(54) TECHNICAL ANALYSIS FORMATION RECOGNITION USING PIVOT POINTS

(75) Inventor: Christopher J. Satchwell, Warsash Southampton (GB)

(73) Assignee: Recognia Inc., Ottawa (CA)

( * ) Notice: Subject to any disclaimer, the term of this patent is extended or adjusted under 35 U.S.C. 154(b) by 1761 days.

This patent is subject to a terminal disclaimer.

(21) Appl. No.: 10/245,263

(22) Filed: Sep. 17, 2002

(65) Prior Publication Data

US 2003/0065607 A1    Apr. 3, 2003

Related U.S. Application Data

(60) Provisional application No. 60/322,643, filed on Sep. 17, 2001, provisional application No. 60/345,331, filed on Nov. 9, 2001.

(51) Int. Cl.
G06Q 40/00    (2006.01)

(52) U.S. Cl. ................ 705/36 R; 705/37; 705/1

(58) Field of Classification Search .............. 705/36 R; 706/19; 707/4, 37, 1
See application file for complete search history.

(56) References Cited

U.S. PATENT DOCUMENTS

| | | | | | |
|---|---|---|---|---|---|
| 5,109,475 | A | * | 4/1992 | Kosaka et al. | 706/19 |
| 5,402,520 | A | * | 3/1995 | Schnitta | 706/16 |
| 5,412,769 | A | * | 5/1995 | Maruoka et al. | 345/440 |
| 5,454,104 | A | * | 9/1995 | Steidlmayer et al. | 707/4 |
| 5,761,442 | A | * | 6/1998 | Barr et al. | 705/36 R |
| 6,801,201 | B2 | * | 10/2004 | Escher | 705/36 R |
| 6,907,404 | B1 | * | 6/2005 | Li | 705/36 R |
| 7,469,238 | B2 | * | 12/2008 | Satchwell | 706/45 |
| 7,542,934 | B2 | * | 6/2009 | Markel | 705/35 |

(Continued)

FOREIGN PATENT DOCUMENTS

GB    2253081    *    8/1992

OTHER PUBLICATIONS

Hatano et al: UK Patent Application GB 2 253 081 A: "Security-exchange decision-making support", published Aug. 26, 1992.*

(Continued)

*Primary Examiner*—Narayanswamy Subramanian
*Assistant Examiner*—Ed Baird
(74) *Attorney, Agent, or Firm*—Osha • Liang LLP

(57) ABSTRACT

A method of formation recognition in technical analysis relies on the use of pivot points. A formation of interest is defined in terms of extreme points. The extreme points can be characterized in relation to one another as a series of local or global extrema in corresponding intervals. The method numbers the pivot points in reverse chronological order and attempts to match pivot points with the extreme points of the formation of interest. The first pivot point is assigned to the first extreme point of the formation. A second pivot point is selected from the interval defined by the first pivot point and the highest numbered pivot point that is a high or a low, as required by the formation. Subsequent pivot points are selected from intervals determined based on the formation and previously determined intervals. A formation is recognized if corresponding pivot points are identified for all extreme points in the formation.

5 Claims, 15 Drawing Sheets

U.S. PATENT DOCUMENTS

| | | | |
|---|---|---|---|
| 7,599,867 B1 * | 10/2009 | Monroe et al. | 705/35 |
| 7,636,703 B2 * | 12/2009 | Taylor | 706/62 |
| 2002/0004774 A1 * | 1/2002 | Defarlo | 705/36 |
| 2003/0131315 A1 * | 7/2003 | Escher | 715/512 |
| 2003/0139957 A1 * | 7/2003 | Satchwell | 705/7 |

OTHER PUBLICATIONS

Rothstein: "The Patterns Hidden In Market Swings", New York Times. (Late Edition (East Coast)), New York, N.Y, Jun. 3, 2000, p. B.7.*

Townshend: "Point out potential & figure the risk", Futures, Chicago, Oct. 2000, vol. 29, Iss. 13; p. 38, 3 pgs.*

Raschke: "It's all in the timing", Futures. Chicago: Jun. 1999, vol. 28, Iss. 6; p. 40.*

Townshend: "Point out potential & figure the risk",. Futures. Chicago: Oct. 2000. vol. 29, Iss. 13; p. 38.*

Rivalland: "False signals are a fact of life rather than a flaw Chart Watch; [A Edition]", Evening Standard. London (UK): Jan. 30, 2001. p. 43.*

Anderson: "Look Bill, I've done good without you: Former Microsoft developer thrives with StockCharts; [National Edition 1]", . National Post. Don Mills, Ont.: Dec. 2, 2000. p. C.5.*

McGrath: "Predictability of Energy Futures Prices", a Thesis submitted to the faculty of Graduate Studies in partial fulfilment of the requirements for the degree of Master of Arts, Department of Economics; Calgary, Alberta; Apr. 1998.*

Murphy, John J., "Technical Analysis of the Futures Markets" ISBN 0-13-898008-X, Chart Construction, Chapter 3, pp. 35-49; New York Institute of Finance; Jan. 1986.

Murphy, John J., "Technical Analysis of the Futures Markets" ISBN 0-13-898008-X, Intra-Day Point and Figure Charting, Chapter 11, pp. 322-343; New York Institute of Finance; Jan. 1986.

Murphy, John J., "Technical Analysis of the Futures Markets" ISBN 0-13-898008-X, Three-Box Reversal and Optimized Point and Figure Charting, Chapter 12, pp. 350-370; New York Institute of Finance; Jan. 1986.

Edwards, R. D. and Magee, J. "Technical Analysis of Stock Trends", ISBN 0-8144-0373-5, Important Reversal Patterns, Chapter 6, St. Lucie Press, 37 pages; 1998.

Kaufman, P. J. "Trading Systems and Methods" ISBN 0-413-14879-2, Point-and-Figure Charting, Chapter 11, John Wiley & Sons, 25 pages; 1996.

* cited by examiner

TIME

TIME

TECHNICAL ANALYSIS FORMATION RECOGNITION USING PIVOT POINTS

The present application claims priority from U.S. Provisional Patent Application No. 60/322,643, filed on Sep. 17, 2001 and U.S. Provisional Application No. 60/345,331 filed on Nov. 9, 2001.

FIELD OF THE INVENTION

The present invention relates to financial analysis and particularly to formation recognition, such as formation recognition in the technical analysis of financial information.

BACKGROUND OF THE INVENTION

Technical analysis, as opposed to fundamental analysis, uses the past price, volume activity, or other measures of a stock, or of a market as a whole, to predict the future direction of the stock or market. The results of technical analysis (sometimes also referred to as "charting") are usually summarized in charts or graphs that are studied by technicians to identify known trends and patterns in the data to forecast future performance.

Traditionally, the approach to technical analysis is a manual one. One important aspect of technical analysis is pattern recognition in which price information for a period of time is graphed or plotted on a Cartesian coordinate system to facilitate visual recognition of established patterns. For example, FIG. 3 illustrates a classical "head and shoulders" pattern indicating future downward movement of the stock.

Manual charting is a tedious process in which the analyst must create or be provided with a graph of past price information. The analyst must then carefully study the information and determine whether the past price information corresponds with a recognized pattern or formation such as that illustrated in FIG. 3. Although the formation of FIG. 3 may appear to be obvious, this is the final highlighted result. The head and shoulders formation illustrated is much more difficult to recognize from raw data such as that illustrated in FIG. 4.

A manual approach to charting can be unreliable because it depends on human pattern recognition ability. It can be error prone due to guesswork, inaccurate heuristics or the absence of a systematic procedure for comparing the available data with all possible or likely formations.

In addition, if the analyst has a predilection for certain formations, the results may be biased towards those formations and may not be as accurate as an unbiased approach. Finally, a manual approach, even with the aid of mechanical or computer assistance is inherently slow due to the human factor.

A recent innovation in technical analysis is the use of neural networks to recognize patterns in the financial data. However, training neural networks to recognize patterns, or formations, in financial results is cumbersome and highly dependent on the quality of data used to train the neural network.

Graphs of time series, particularly financial time series, sometimes exhibit specific formations prior to moving in a particular direction. Some relevant formations have been described by a number of authors, including Edwards, R. D. and Magee, J. "Technical Analysis of Stock Trends" ISBN 0-8144-0373-5, St. Lucie Press 1998 and Murphy, J. J. "Technical Analysis of the Futures Markets" ISBN 0-13-898008-X, New York Institute of Finance 1986. To anticipate the likely behaviour of some time series, it is advantageous to be able to recognise predictive formations as soon as they occur. Many predictive formations share a common characteristic of being capable of representation by a stylised zig-zag line. Explanations given in Murphy, supra, are largely framed around this concept. It follows that if a method can be found to find suitable zig-zag lines, then the recognition of many predictive formations is greatly simplified. To construct zig-zag lines of a type required to recognise formations, it is particularly useful to categorise time series turning, or pivot, points, as different regions of a formation often require turning points of different strengths. Categorization facilitates the application of appropriate recognition filters to determine the relevance of turning points at various locations in a potential formation.

One well-known technique in technical analysis is point and figure charting. In point and figure charting, the price of, for example, a stock is plotted as columns of rising Xs and falling Os to denote price movement greater than, or equal to, a threshold amount, denoted a box size. Unlike other charting methods, such as open, high, low, close (OHLC), bar or candlestick, where price action is plotted according to time, point and figure charting is more time independent and price, not time, dictates how point and figure charts take shape. For example, a series of volatile trading sessions over the course of a week could fill an entire page or screen in a point and figure chart, whereas a month of inactivity or static range trading might not be reflected on the chart, depending on the chosen box size. The box size determines how much background "noise" is removed from the price action, and, hence, the granularity of the resulting chart. The factors that typically influence the choice of box size include volatility and the time horizon being examined.

The technique of conventional point and figure charting is described in detail in Kaufman, P. J. "Trading Systems and Methods" ISBN 0-413-14879-2, John Wiley & Sons 1996. In summary, a box size, datum price and datum time, are chosen. If a new high exceeds the sum of the current datum plus a box size, a 'X' is written in a column and the datum price shifted to the datum plus box size. When the market reverses by more than some multiple of the box size, a column of Os is formed, and continues in a similar manner until the market reverses by more that the prescribed multiple of box sizes. The chart can be based on tick by tick results, or on the OHLC data. In conventional point and figure charting, the use of OHLC data can introduce ambiguity into the charting process, as a large price differentials between high and low in a single day can occur, potentially resulting in a reversal in both directions without it being clear whether the high or low occurred first.

One attractive feature of point and figure charting is the fact that conventionally accepted chart formations, such as double tops and triangles, can be clearly identified. Buy signals can be generated when prices surpass a previous bottom pivot point by one or more boxes, and the reverse for sell signals. This eliminates much of the subjectivity of other analysis techniques. However, point and figure charting is highly dependent on the box size chosen, and relevant formations can be missed if the box size is not appropriate. Some points to note are: (1) point and figure charting conventionally works forwards from a datum rather than backwards from the end of the series. This means that the sequence of X's and O's required to generate a trading pattern depends on the date and price used to start the sequence—which usually results in delayed pattern completion dates, depending on how fortunate the choice of origin was (2) the intention is to produce a chart using a fixed box size, from which a formation will hopefully be recognised visually; (3) the box size acts as a filter, in that small fluctuations in value do not trigger the creation of either a new 'X' or 'O', but large fluctuations do;

and (4) point and figure charts are independent of time, but to create a zig-zag line, time is required. Products available for automating point and figure charting suffer similar disadvantages.

An alternative method is the use of pivot points in the technical analysis of a time series. The time series can include time series of financial data, such as stock prices, medical data, electrocardiogram results, or any other data that can be presented as a time series, and in which it is desirable to identify turning points, trends, formations or other information. The method of pivot points uses a modified point and figure technique to determine the pivot, or turning points, and categorizes them according to the box size at which they appear, while associating time, or lag, information with each identified point. The basic premise is to apply the point and figure charting backwards (i.e. start from the end of a time series and work backwards) using progressively decreasing box sizes, and note the box size at which a turning point first appears on a point and figure chart. The box size provides a measure of a turning point's spatial importance, and so spatial categorization is achieved. Unlike conventional point and figure methods, exact time series values, and lags from the end, are recorded for extreme values associated with each column.

Prior to the actual point and figure charting, the method of categorizing pivot points begins with a spatial categorization of a candidate time series. First, the time series is defined, usually by taking some point of interest from a larger series (henceforth called the "end point") and a suitable number of prior values to define a search period. The lag of each point with respect to the end point is determined, i.e. the end point has lag=0, the first prior point has lag=1, the second prior point has lag=2, etc.

The maximum and minimum spatial values, MaxY & MinY, of the time series are then determined. The use to which any recognised formation is to be put will normally involve some minimum spatial value. In the example of a price-time series, this will often be a minimum price move that makes a trade worth taking. Some minimal spatial value is, therefore, defined, which will normally be dependent on the intended use of the result. To determine MaxY, the maximum and minimum prices within a search period are found. MaxY is half the difference between these maximum and minimum prices.

Intrinsic noise, INoise, in the time series is then estimated. One way of determining the intrinsic noise is to construct a centred moving average and then find the standard deviation of fluctuations around that average, through the time series. A minimum increment, MinInc, of box size is defined. This can be a multiple or fraction of the minimum spatial value defined above, and is generally dependent on the resolution desired for turning point categorization. Limits for box sizes can then be determined. Point and figure charts have to be created for discrete box sizes, so it follows that suitable limits can be expressed in terms of the number of discrete increments that make up a box. In terms of pseudo code, suitable limits are: trunc(0.5*(MaxY−MinY)/MinInc+1) and trunc(INoise/MinInc+1), for upper and lower limits respectively.

Using the determined upper and lower limits, point and figure charts can now be created, starting with high box sizes and working down to low box sizes in incremental steps. These point and figure charts may be forwards or backwards facing. For price formation recognition methods, backwards-facing charts are generally preferred.

For each box size, the data necessary to create a point and figure chart is determined. Moving backwards through the time series, any new extreme price movements in the same market direction, are noted, together with their associated lag from the end. If the market reverses direction by more than a box size, a new column is created. The extreme value prior to the reversal, and its associated lag, define a turning point. Any turning point that has not been previously found is tagged with the box size, or, in a presently preferred embodiment, the number of increments of the box size, or box size index, for which it is first found and its lag from the end of the series. This results in a set of turning, or pivot, points categorized according to their spatial importance, and their relative time occurrence.

Referring to FIGS. 1 and 2, a method for backwards facing point and figure charting is shown. The flowchart assumes that the lags, minimum box size increment, intrinsic noise, and maximum and minimum spatial values have been determined as described above. While the following description assumes that the time series data includes both high and low values for each time period, continuous data can also be used, in which case the high and low for each time period are considered to be equal. First, at step 101, a pointer to the time series is set to the end point (i.e. the record at lag=0), the box size is set, and the present market direction of the final column, or breakout direction, of the point and figure chart is set. The breakout direction can be either upwards or downwards. In a bull trend, if a reversal formation were sought, the direction of the final column would be set to downwards (i.e. a falling column). In the same bull trend, if a continuation formation were sought, the direction of the final column would be set to upwards (i.e. a rising column). The opposite applies to bear trends. This means that for any given price record and box size, two different point and figure charts can be generated by the method of categorizing pivot points with the choice determined by the purpose to which the chart is to be used.

As shown at step 102, the method of categorizing pivot points proceeds down the left side of the flowchart if the breakout direction is set as upwards or rising, and down the right side of the flowchart if the breakout direction is set as downwards or falling. Assuming that the breakout direction is upwards, in step 103*a* (and vice versa for step 103*b*) the end price is set to the current high at lag=0, and the extreme price is set to the current low at lag=0. Initially, both the end lag and extreme lag are set to "0". Generally, the end price is derived from the most recent price bar associated with the right-most column of the point and figure chart under construction. Extreme price and lag refer to conditions assumed to occur earlier in the development of the column and are recorded to provide a best estimate from which earlier prices can be compared for new extremes or reversals.

The method of categorizing pivot points then enters a loop at step 104 until the time series has been examined for a desired search period where each record in the time series is examined in succession. Again, assuming that the column under consideration has an upwards direction at step 105, the current low of the next record is compared to the extreme price at step 106*a*. If the current low is less than the extreme price, the extreme price is set to the current low, and the extreme lag is set to the current lag at step 107*a*, and method moves to the next record in the time series and returns to step 105. If not, the difference between the current high and the extreme price is compared to the selected box size at step 108*a*. If the difference is less than the box size, no reversal has occurred, and the method again moves to the next record and returns to step 105. If the difference is greater than the box size, a reversal has occurred at this box size and the data necessary to identify the pivot point is recorded at step 109*a*. The identified pivot point has a price equal to the extreme price and a lag equal to the extreme lag. In general, extremes refer to conditions in the current column and become start prices for a current column, and end prices for the column immediately to its left when a reversal is detected. The column direction is changed as a result of the reversal, and the method moves to previous record (i.e. the next lag) in the time series and returns to step 105 from which it will proceed to step 106b. Steps 106b to 109b are as illustrated, and are the converse of those described above. An additional advantage of producing a point and figure chart in this backwards sense is that the earliest possible pattern completion date is assured, unlike the results of forwards facing charts where pattern completion is dependent on the starting conditions used.

The above described method can then be repeated at each desired box size, preferably from largest to smallest, and the first appearance of a pivot point, and the box size at which it appears can be noted. This results is the categorization of pivot points according to their relative spatial importance, which information can be used most advantageously in subsequent technical analysis formation recognition.

SUMMARY OF THE INVENTION

It is an object of the present invention to obviate or mitigate at least one disadvantage of previous methods associated with known methods of technical financial analysis.

In an aspect of the invention, there is provided a method of formation recognition in pivot points, the formation defined by a sequence of alternating high and low extreme points, the method comprising: numbering the pivot points of interest in reverse chronological order (pivot points $p_1 \ldots p_n$); determining the polarity of formation based on the first extreme point $e_1$; identifying the first pivot point $p_1$ with the first extreme point $e_1$; setting p to be the highest numbered pivot point that is a high or a low depending on the formation and the polarity of the formation; setting the interval $I_k$, corresponding to $e_k$, to be $(p_1,p]$ determining, based on the formation of interest, the polarity of the extreme point $e_k$; identifying a pivot point in $I_k$, the pivot point being an extremum in $I_k$ and having the same polarity as the determined polarity $e_k$; iteratively, for each of extreme points $e_{k-1}$ to $e_2$, determining an interval corresponding to the extreme point based on the formation and previously determined intervals; determining the polarity of extreme point, identifying a pivot point in the interval, the pivot point being an extremum in the interval and having the same polarity as the determined polarity of the extreme point; and recognizing the formation of interest if corresponding pivot points $p_1 \ldots p_k$ have been identified as corresponding to extreme points $e_1$ to $e_k$, otherwise not recognizing the formation of interest.

In another aspect, the present invention provides a method of continuation triangle formation recognition using pivot points. The method consists of sequentially numbering the pivot points in reverse chronological sequence; selecting an odd numbered initial pivot number as the first peak pivot point; and repeatedly, until a triangle formation is recognized: a) determining a line through the first numbered pivot through to the first peak pivot and rotating the coordinate system to be coincident with the line; b) ensuring that no pivot intermediate between the first peak pivot and the first numbered pivot has a larger value; c) determining a first trough pivot point between the first peak pivot and the first numbered pivot having a smallest value; d) determining a second peak pivot point between the first trough pivot point and the first numbered pivot having a largest value; and e) determining a second trough pivot point between the second peak pivot point and the first numbered pivot point having a smallest value; and identifying a triangle formation comprising the first peak pivot, the first trough pivot, the second peak pivot, the second trough pivot and the first numbered pivot.

In a further aspect, the present invention provides a method of reversal diamond formation recognition using pivot points. The method numbers the pivot points in reverse chronological order and attempts match to pivot points with the nine extreme points of a reversal diamond formation. An initial current point is selected to be the highest even numbered pivot point. A low vertex of the formation is found by identifying the lowest pivot point between the current pivot point and the right most pivot point. A first right peak is found by identifying the highest pivot point between the low vertex and the right most pivot point. A right trough is located by identifying the lowest pivot point between the first right peak and the right most pivot point. Similarly a second right peak is determined. Then a first left peak is found by identifying the highest pivot point between the low vertex and the current point. Similarly a left trough and a second left peak are found. A reversal diamond formation is recognized if the second left peak is the current pivot point otherwise a new current pivot point is selected and the method repeated.

Additionally, validity conditions relating to adequate prior trend, sufficient symmetry and enough price bars in the formation, etc. must also be satisfied.

Advantageously, the present invention is able to systematically determine all possible instances of a specified formation such as continuation triangle formation or reversal diamond formation. Another advantage of the present invention is that it does not require human judgment and can be implemented using computers.

A further advantage of the present invention is that the backward facing nature of pivot points allows a formation to be recognized at the earliest possible time. By contrast, a forward facing method may introduce a time delay of indeterminate duration arising from the choice of box size and starting point of the sequence of data points. Thus, it is possible that a suboptimal combination of these choices could result in requiring additional later data points when compared with the preferred use of backward facing pivot points.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Embodiments of the present invention will now be described, by way of example only, with reference to the attached drawings, wherein.

DETAILED DESCRIPTION

Generally, the present invention provides a method for the recognition of formations in financial data such as stock prices such as continuation triangle or reversal diamond formations. Such formations are useful in allowing investors and others who follow the financial markets to identify strategic buying and selling opportunities.

To allow a general method applicable to several different types of formations, we begin by establishing some terminology. Assume that there are n pivot points. Then we can refer to each pivot point as $p_i$, where i=1 ... n. Assume that the formation of interest has k extreme points, $e_1 \ldots e_k$. Then the method of the present invention is to match the k extreme points to a corresponding number of pivot points so that the relationships between the extreme points is preserved in the relationships between the pivot points. Regarding intervals, we use the following notation: [a,b] refers an interval inclusive of both end points; (a,b] refers to an interval exclusive of the first end point and inclusive of the second end point; and (a,b) refers to an interval exclusive of the second end point.

Slightly more rigorously, we need to find $p_1 \ldots p_k$ so that if we treat $e_1 = p_1 \ldots e_k = p_k$ then the extreme nature of points $e_1$ to $e_k$ is respected.

Still more rigorously, we can characterize the formation of interest in terms of a set of k intervals ($I_1 \ldots I_k$) and a corresponding extremum or extreme point ($e_1 \ldots e_k$) in each interval. By an extremum we mean a point p in an interval I such that y(p) is a maximum (or a minimum) in interval I i.e. y(p) is greater than or equal to (less than or equal to) the value at that point, denoted $y(p_i)$, (e.g. price) for all points $p_i$ in I. Thus, referring to pivot points, for example, p is a (maximum) extreme point in the interval [$p_1, p_k$] if price at pivot point p is greater than the prices associated with all other pivot points in that interval.

Figure 1:
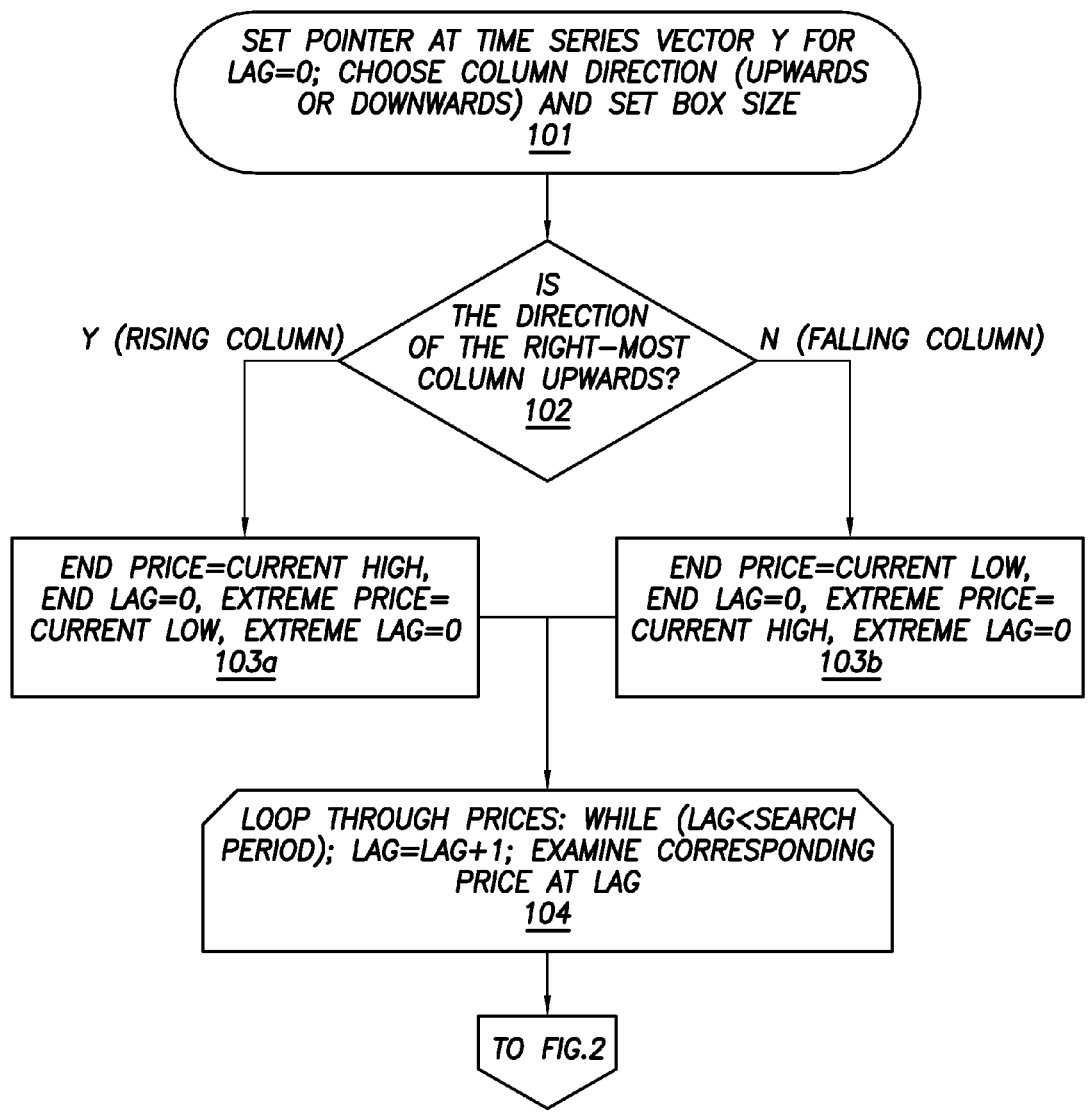
FIG. 1 is a reference flowchart of a method for pivot point identification.
Figure 2:
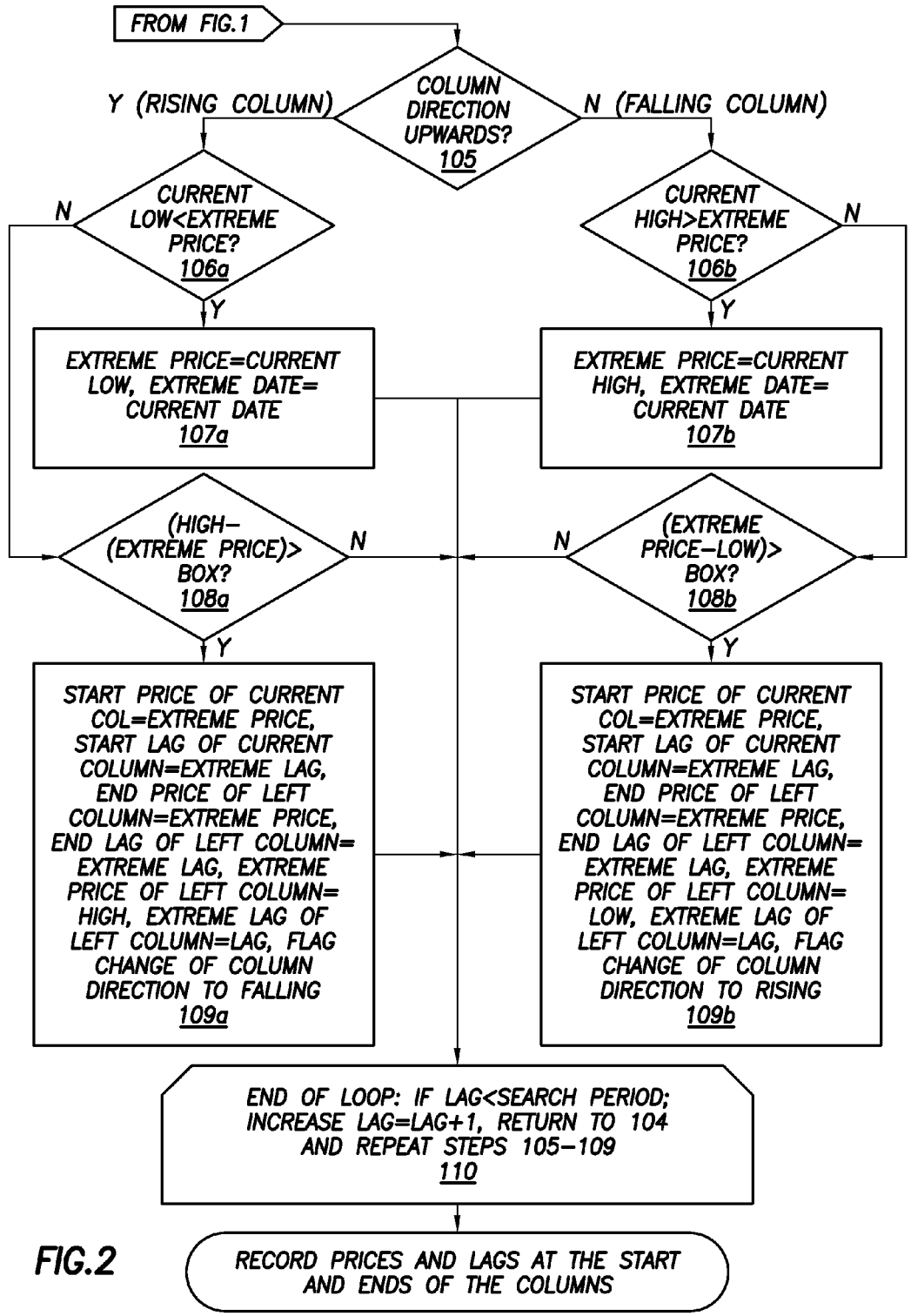
FIG. 2 is a continuation of the flowchart of FIG. 1.
Figure 3:
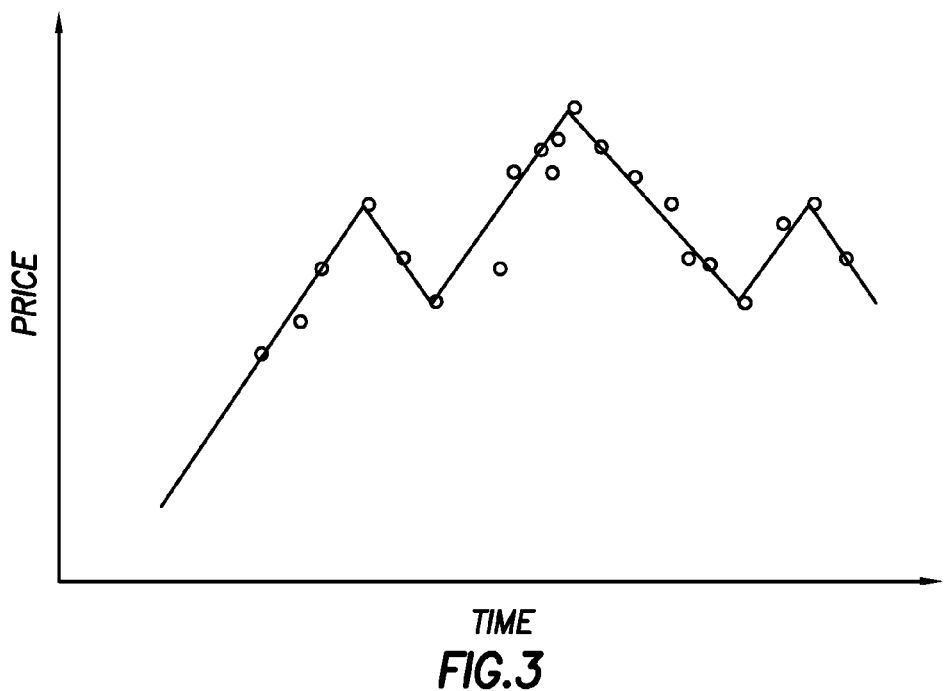
FIG. 3 illustrates a head and shoulders formation from technical analysis of financial data.
Figure 4:
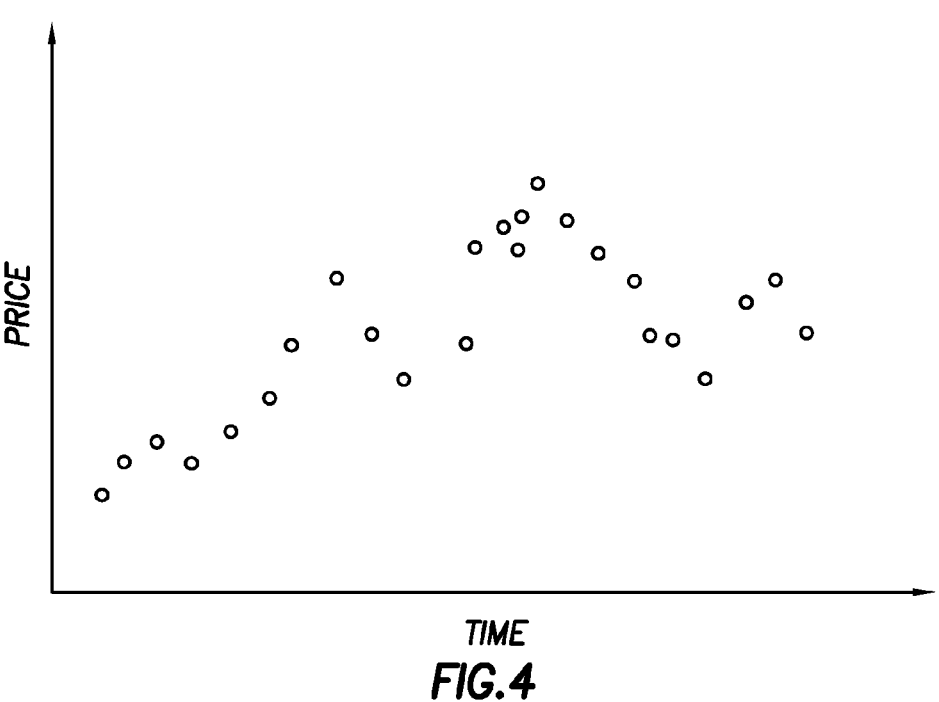
FIG. 4 illustrates raw financial data before the head and shoulders formation of FIG. 1 has been identified.
Figure 5:
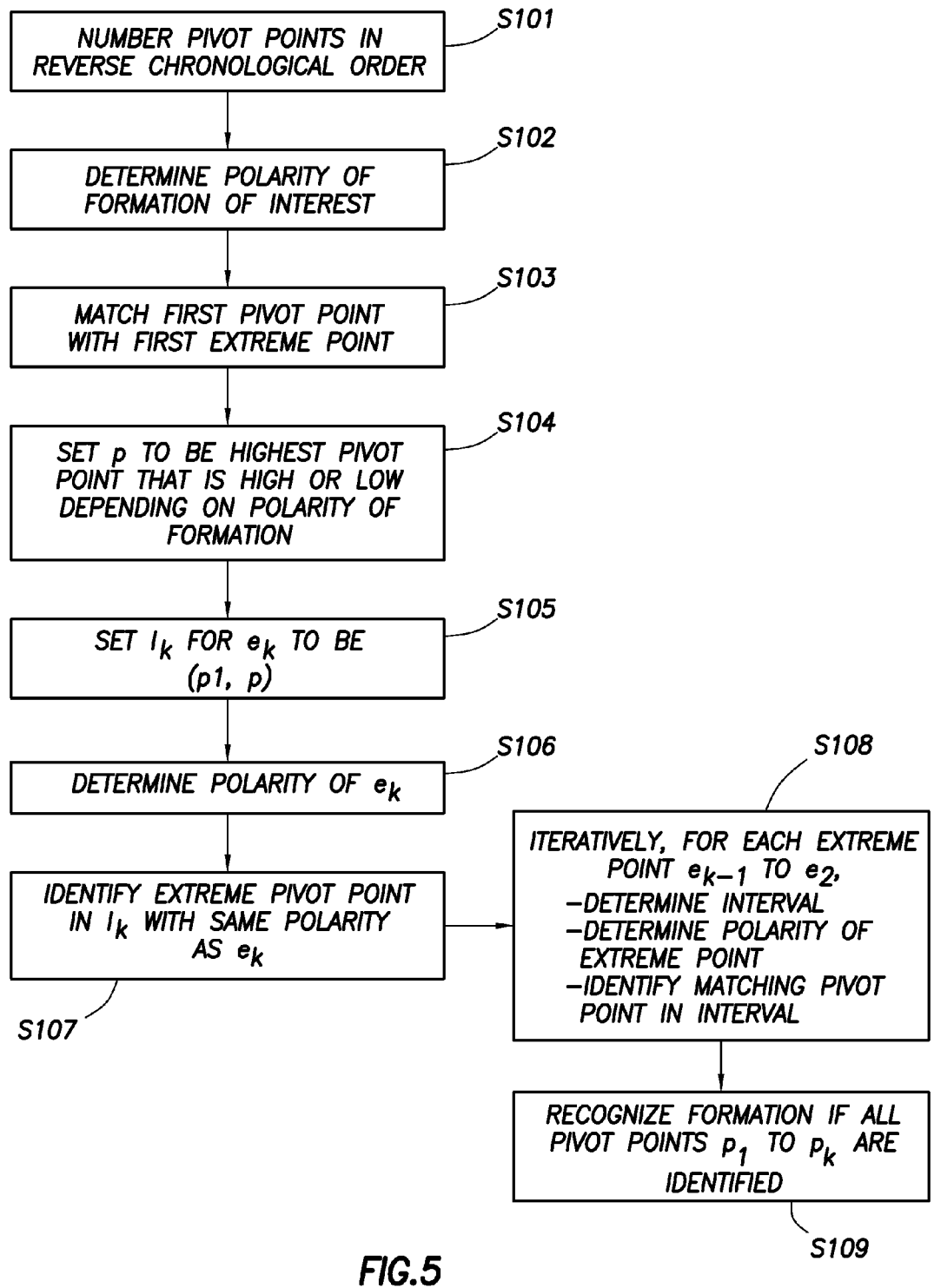
FIG. 5 illustrates a method according to an embodiment of the present invention.

Referring to FIG. 5, according to an embodiment of the present invention, a formation of interest defined by extreme points $e_1 \ldots e_k$, is compared with a sequence of pivot points according to the following method:

Step 101: Number the pivot points of interest in reverse chronological order (pivot points $p_1 \ldots p_n$).

Step 102: Determine the polarity of formation based on the first extreme point $e_1$.

Step 103: Identify the first pivot point $p_1$ with the first extreme point $e_1$.

Step 104: Set p to be the highest numbered pivot point that is a high or a low depending on the formation and the polarity of the formation.

Step 105: Set the interval $I_k$, corresponding to $e_k$, to be ($p_1, p$].

Step 106: Based on the formation of interest, determine the polarity of the extreme point $e_k$.

Step 107: Identify a pivot point in $I_k$, the pivot point being an extremum in $I_k$ and having the same polarity as the determined polarity $e_k$.

Step 108: Iteratively, for each of extreme points $e_{k-1}$ to $e_2$, determine an interval corresponding to the extreme point based on the formation and previously determined intervals;

determine the polarity of extreme point;

identify a pivot point in the interval, the pivot point being an extremum in the interval and having the same polarity as the determined polarity of the extreme point.

Step 109: Recognize the formation of interest if corresponding pivot points $p_1 \ldots p_k$ have been identified as corresponding to extreme points $e_1$ to $e_k$, otherwise the formation of interest is not recognized.

Referring to step 9, the formation of interest is not recognized if a suitable pivot point cannot be found in an interval because there are no pivot points of the right polarity (e.g. only highs exist in an interval when we are looking for low) or if the interval is empty. Alternatively, the satisfaction of additional conditions such as those discussed above are required before the formation is recognized.

The method can be generalized to multiple formations of interest by, for example, sequentially testing for different formations.

Continuation Triangle

In the example of a continuation triangle formation k extreme points (k being odd), the first step is to number the pivot points (in reverse chronological order) to provide an ordered set of pivot points $p_1 \ldots p_n$.

Figure 6:
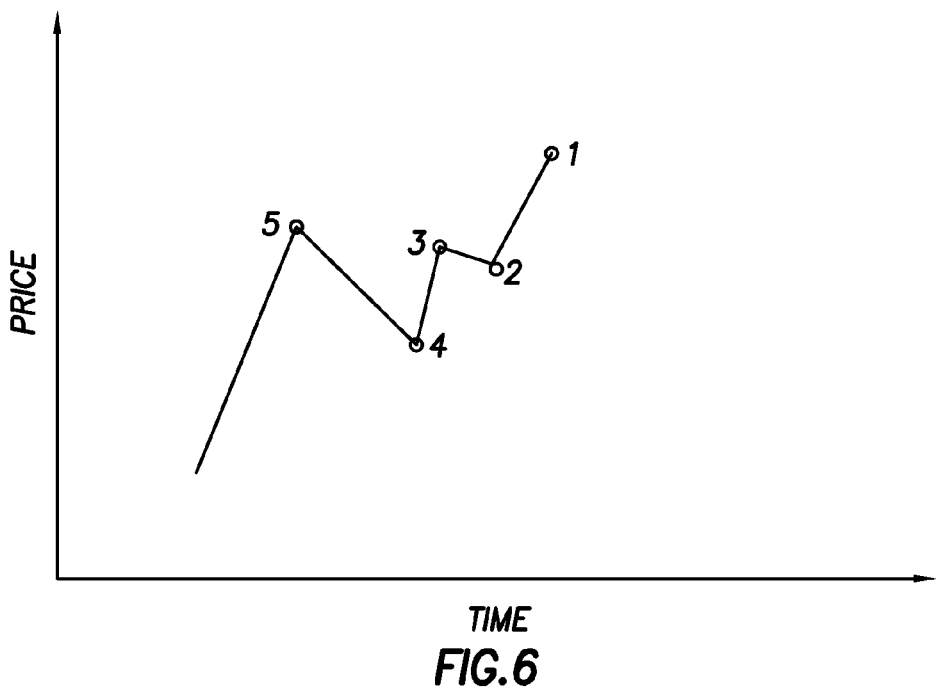
FIG. 6 illustrates a continuation triangle formation defined by five extreme points.

Referring to FIG. 6, we note that pivot points shown alternate between "highs" and "lows". Since $e_1$ (point 1 in FIG. 6) is a maximum, it must represent a "high" pivot point. Therefore, odd numbered points must be "highs" and even numbered pivot points must be "lows". (Conversely, in the case of a reversal diamond (see FIG. 9) in which $e_1$ (y(1)) is a low, the odd numbered pivot points must be "lows" and the even numbered pivot points must be "highs"). In the example of FIG. 6, we are looking for a "high" $e_5$. Accordingly, in FIG. 7, we choose the interval in which to look for $e_5$ to be (1,9]. More generally, the interval is ($e_1$, p], where p is $p_n$ if n is even; and p is $p_{n-1}$ if n is odd. Put another way, if we are looking for a high, then p is $p_i$ where i is the largest number less than n such that pivot point p is a high. Symmetrically, if we are looking for a low pivot point then p is $p_i$ where i is the largest number less than or equal to n such that pivot point p is a low. We refer to the polarity of a formation as being high when $e_1$ is high pivot point; we refer to the polarity of a formation as being low when $e_1$ is a low pivot point. Similarly, we also refer to the polarity of a pivot point or extreme point as being high or low.

For a five point continuation triangle formation, we have five extreme points, e1 to $e_5$. Referring to FIG. 6 we note that e1 is the top of a rise and e5 is the highest of the remaining extreme points. The point e4 is the lowest point (strictly) between e5 and e1; e3 is the highest point between e4 and e1; and e2 is the lowest point between e3 and e1. Referring to FIG. 6, in terms of intervals then, we can characterize the extreme points as follows:

e1 is the maximum in the (degenerate) interval [$p_1, p_1$];

$e_5$ is the maximum in the (half-open) interval ($e_1, p_n$];

$e_4$ is the minimum in the (open) interval ($e_1, p_{e5}$)

$e_3$ is the maximum in the interval ($e_1, p_{e4}$); and $e_2$ is the minimum in the interval ($e_1, p_{e3}$), where $p_{e1}$ is the pivot point corresponding to extreme point $e_1$ More generally, in a k point continuation triangle formation, the following extrema and intervals characterize that formation.

$e_1$ is an extremum in the (degenerate) interval [$p_1, p_1$] (i.e. $e_1 = p_1$);

$e_k$ is an extremum in the (half-open) interval $(e_1, p_n]$;
$e_{k-1}$ is an extremum in the (open) interval $(e_1, p_{ek})$
$e_{k-2}$ is an extremum in the interval $(e_1, p_{ek-1})$
...
$e_2$ is an extremum in the interval $(e_1, p_{e3})$ We note that maxima and minima are alternating and that the intervals are dependent on the definition of the formation of interest.

Figure 7:
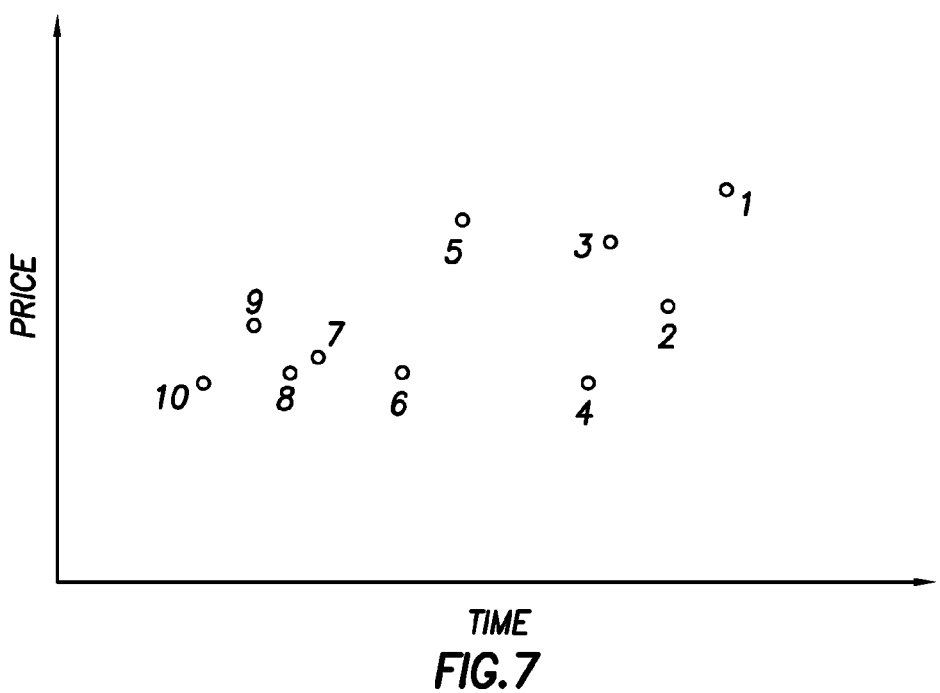
FIG. 7 illustrates example pivot points for comparison with the continuation triangle formation of FIG. 6 using the method of the present invention.

Referring to FIGS. 8A to 8E, a specific example of formation recognition of a triangle formation recognition is provided. We begin with the identification of pivot points in raw data. An example of pivot points is illustrated in FIG. 7. The triangle formation is exemplified by the pattern of FIG. 6 which is defined by the five extreme points indicated. Triangle formation recognition comprises matching the triangle formation of FIG. 6 with the pivot points of FIG. 7. It should be noted that by points we refer to points in a two dimensional space, for example, (x,y) coordinates, (time, y) or (time, price).). For reasons of brevity and clarity in the rest of this document, the convention is adopted whereby a statement such as y(trough1)=y(2) means that the point [x(trough1), y(trough1)] is coincident with the point [x(2), y(2)].

Referring to FIGS. 8A to 8E, the pivot points are numbered in reverse chronological order so that them most recent pivot point in time (right most pivot) is number 1 (step 1).

The process is an iterative one and generally proceeds from left to right focussing on a current pivot denoted by PivNum (step 3). We begin the analysis by initially setting PivNum to be the number of the pivot that has been assigned the largest odd number (step 2). Note that this is either the left-most pivot or the second left-most pivot.

In order to facilitate our analysis of triangles, we perform a transformation of the coordinate system by finding a least squares line through pivots (1 . . . PivNum) and rotate the price-time coordinate system to be co-incident with this line. We denote the new coordinates (x,y) where x will mainly be influenced by time and y by price. A triangle will now be sought in terms of (x,y) (step 4).

Next, we determine whether there is a pivot larger than the current pivot PivNum between the current pivot PivNum and pivot 1 (step 5). More specifically, we determine whether y(PivNum) is the largest until y(1). If the current pivot is not the largest and a larger intermediate pivot exists then the formation does include the current pivot PivNum and the process advances to the next smallest odd-numbered pivot, i.e. PivNum=PivNum−2.

This step is repeated until y(PivNum) is the highest peak. Note that PivNum must be at least 5. In other words, if PivNum is 4 or less then there are not enough remaining pivot points for the formation to exists. Once this highest peak has been found, according to the triangle formation of FIG. 6, three further pivots of progressively lesser importance need to be found, together with a breakout to confirm the existence of a triangle (step 6).

At step 7, we find the minimum value of y between y(PivNum) and y(1) and we denote this value by y(trough1). At step 8, if y(trough1)=y(2) then no triangle formation exists. The method then proceeds to node F labelled as step 26 and according to step 27, the end of loop for PivNum is encountered. If PivNum is 5 then the loop has ended without identifying a triangle formation. If the counter is greater than 5 then the counter PivNum is decremented by 2 at step 3 and the process continues with the new value of PivNum at step 4.

At step 9, we look for the highest high between y(trough1) and y(1) and we denote this by y(peak2). If y(peak2)=y(1) then there is no triangle formation and the method terminates (step 10). Otherwise we continue by looking for the lowest low between y(peak2) and y(1) (step 11). We denote this y(trough2). Because y(PivNum) was odd and peaks follow troughs in the pivot categorization, it follows that two peaks, two troughs and a rising final tail have now been established. This is the basis for the existence of a triangle formation. We now examine other conditions.

If any of the following conditions are not satisfied then no acceptable triangle formation will be recognized:
There must be enough price bars (step 12); and
The triangle must have enough symmetry (step 13).

The peaks and troughs of a triangle in (x,y) space are directly analogous to those in (time, price) space, so we now revert to (time, price) knowing where the peaks and troughs are going to be. Upper (touching peaks) and lower (touching troughs) trendlines are drawn and related conditions examined (step 14).

If the upper trendline is greater than the lower trendline at breakout then no triangle formation will be recognized (step 15). In addition, if the trendlines are too parallel then no formation will be recognized (step 16).

Next, at step 17 a baseline is calculated and if the baseline is not sufficiently large for a useful trade then no triangle is recognized (step 18). The position of the apex of the triangle is determined and the aspect ratio (i.e. the distance from the baseline to the apex, divided by the baseline) of the triangle is calculated (step 19). If the aspect ratio is too large (i.e. the triangle is too long and thin) then no triangle is recognized (step 20).

Step 21 requires that there be sufficient prior trend otherwise no triangle will be recognized.

Step 22 requires that the final close be above the upper trend line otherwise no triangle will be recognized. If the final close is above the upper trend line this must be the first close (since the final trough) above the upper trend line to qualify (see step 23).

Step 24 tests whether price(ypeak1)−price(PivNum)>acceptable fraction of baseline. If so then no triangle is recognized otherwise, the existence of a triangle has been confirmed (step 30). Next the triangle is classified according to type.

According to step 31, if both trend line gradients are positive then there is no triangle. Next step 33 determines if the difference in values of peaks is less than an acceptable fraction of baseline. If so, the triangle is an ascending triangle. If not then step 35 tests whether the upper and lower trend line gradients are both less than zero. If so then the formation is a wedge, otherwise the formation is a symmetrical triangle formation.

Figure 8A:
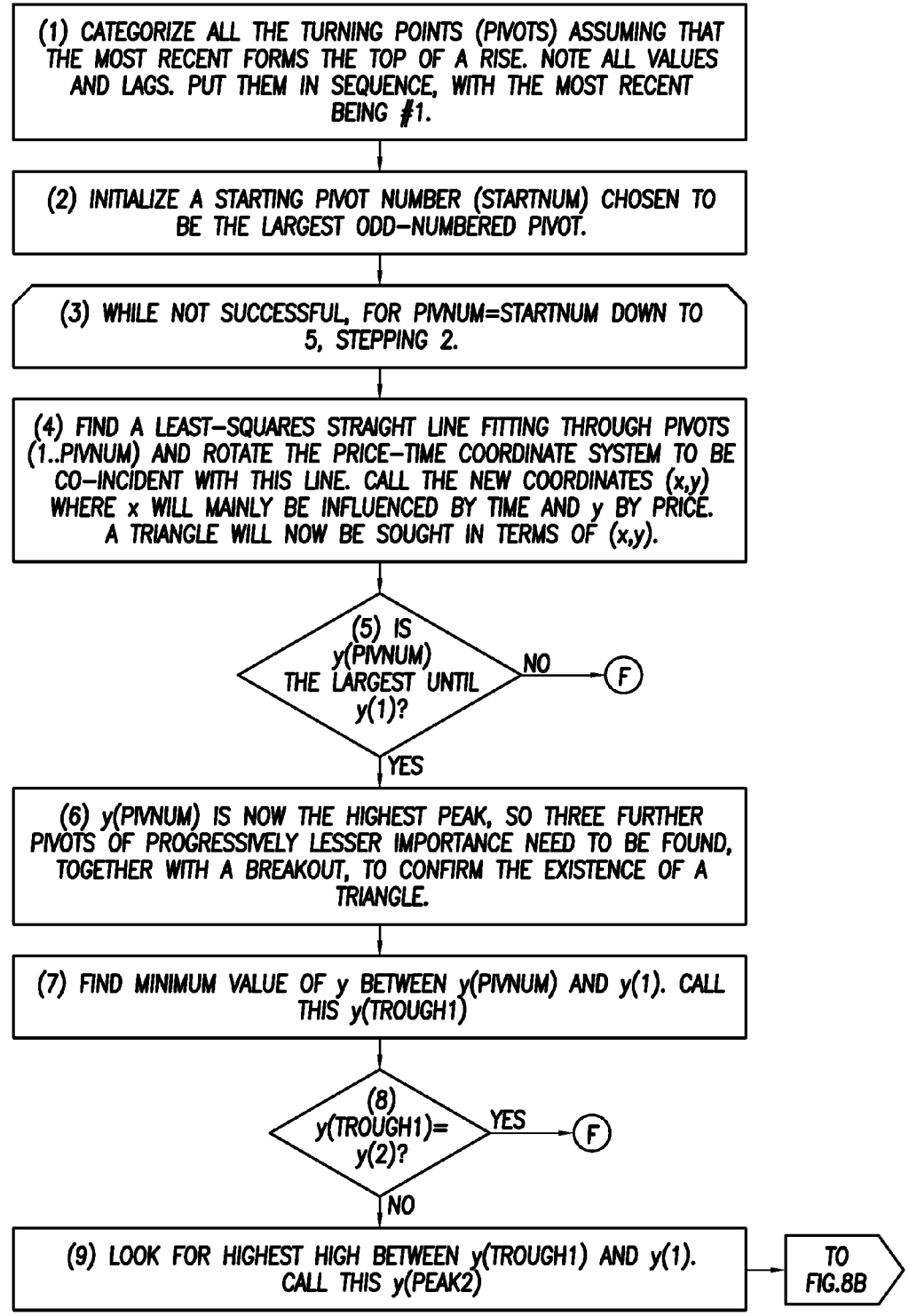
FIGS. 8A to 8E illustrate a flowchart showing the steps of continuation triangle formation recognition according to the present invention.
Figure 8B:
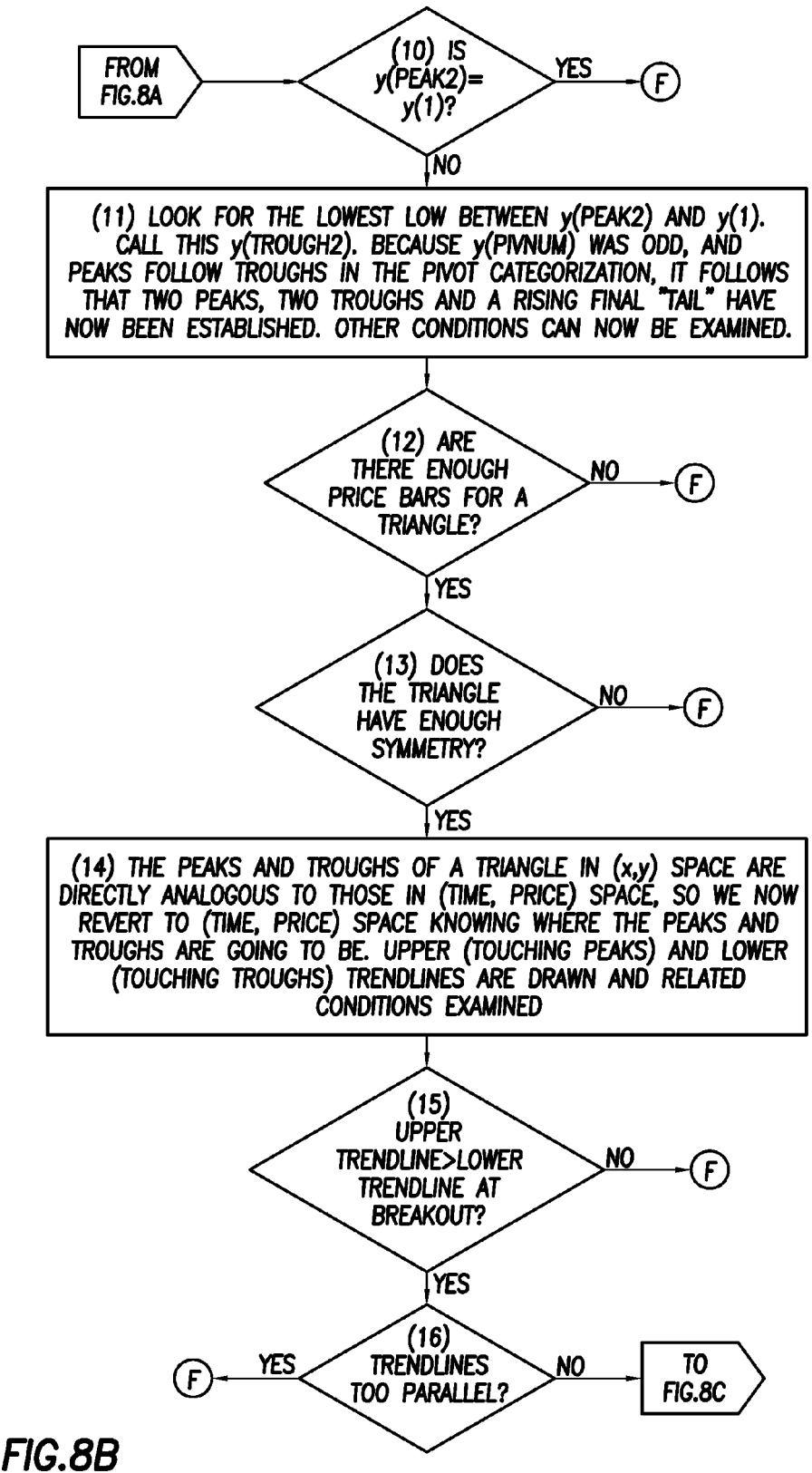
Figure 8C:
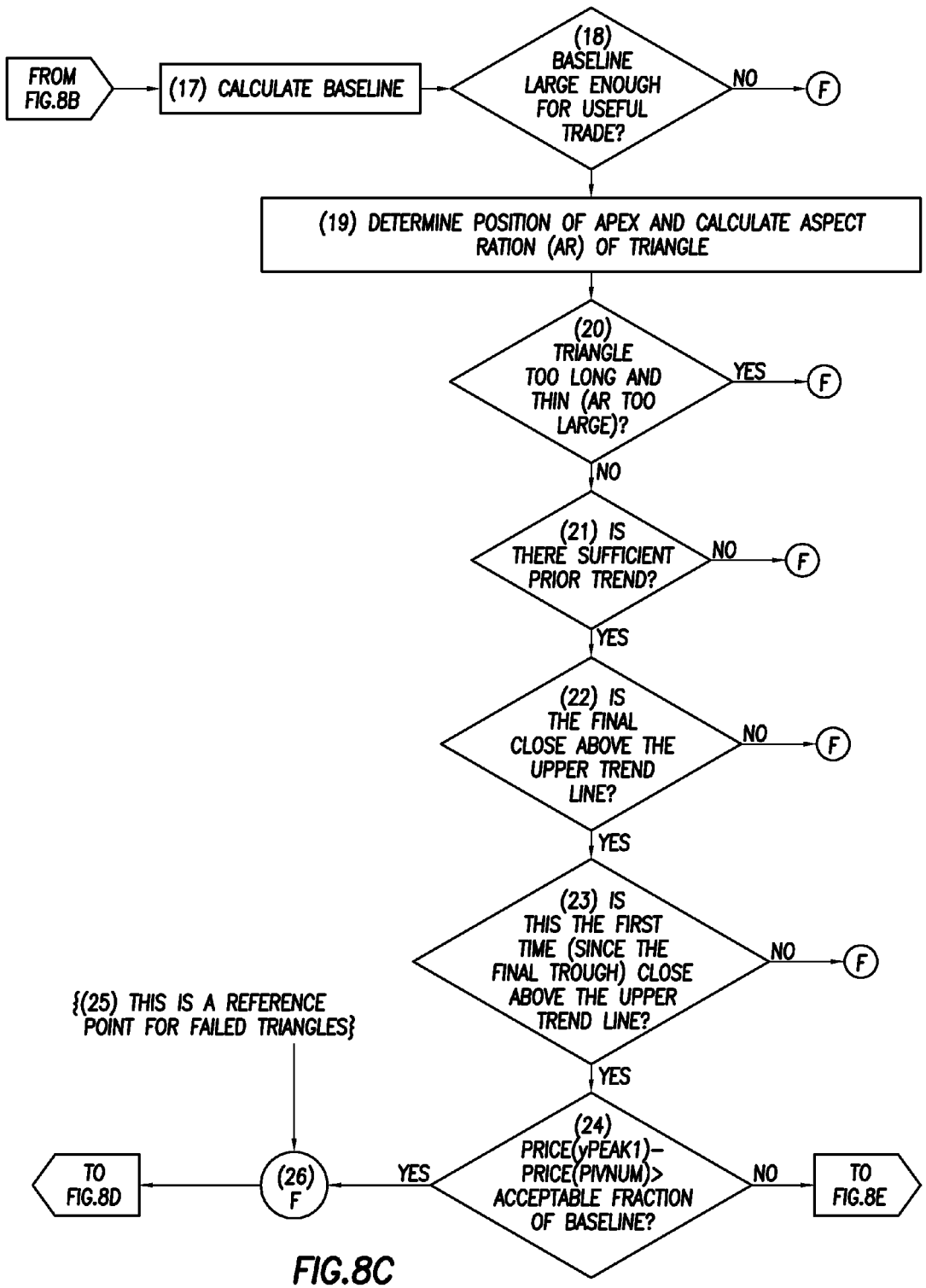
Figure 8D:
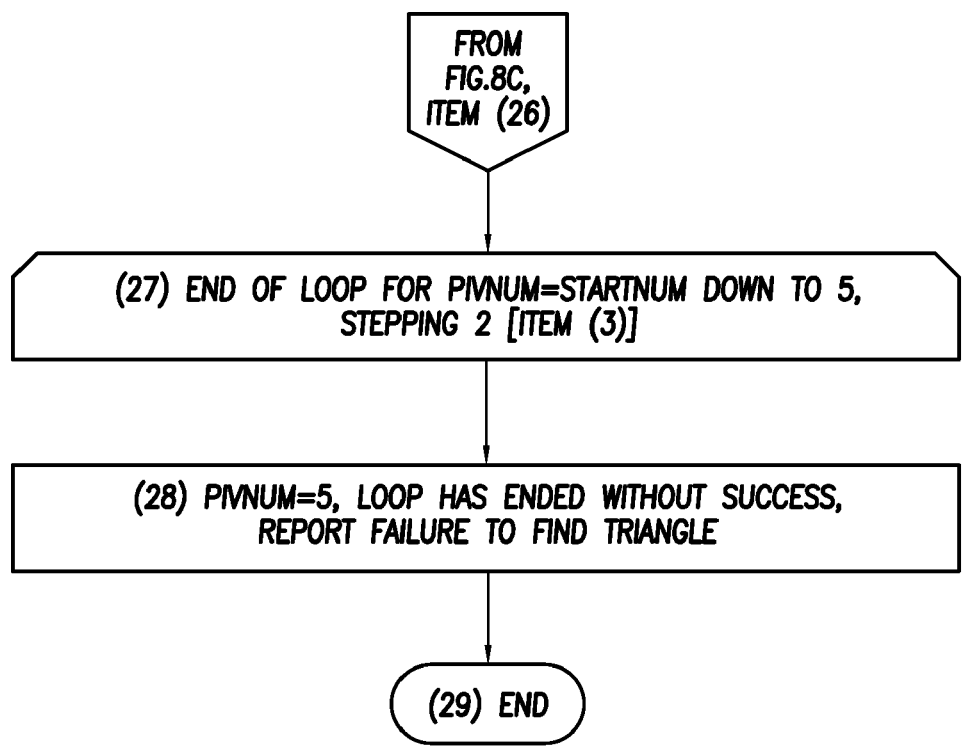
Figure 8E:
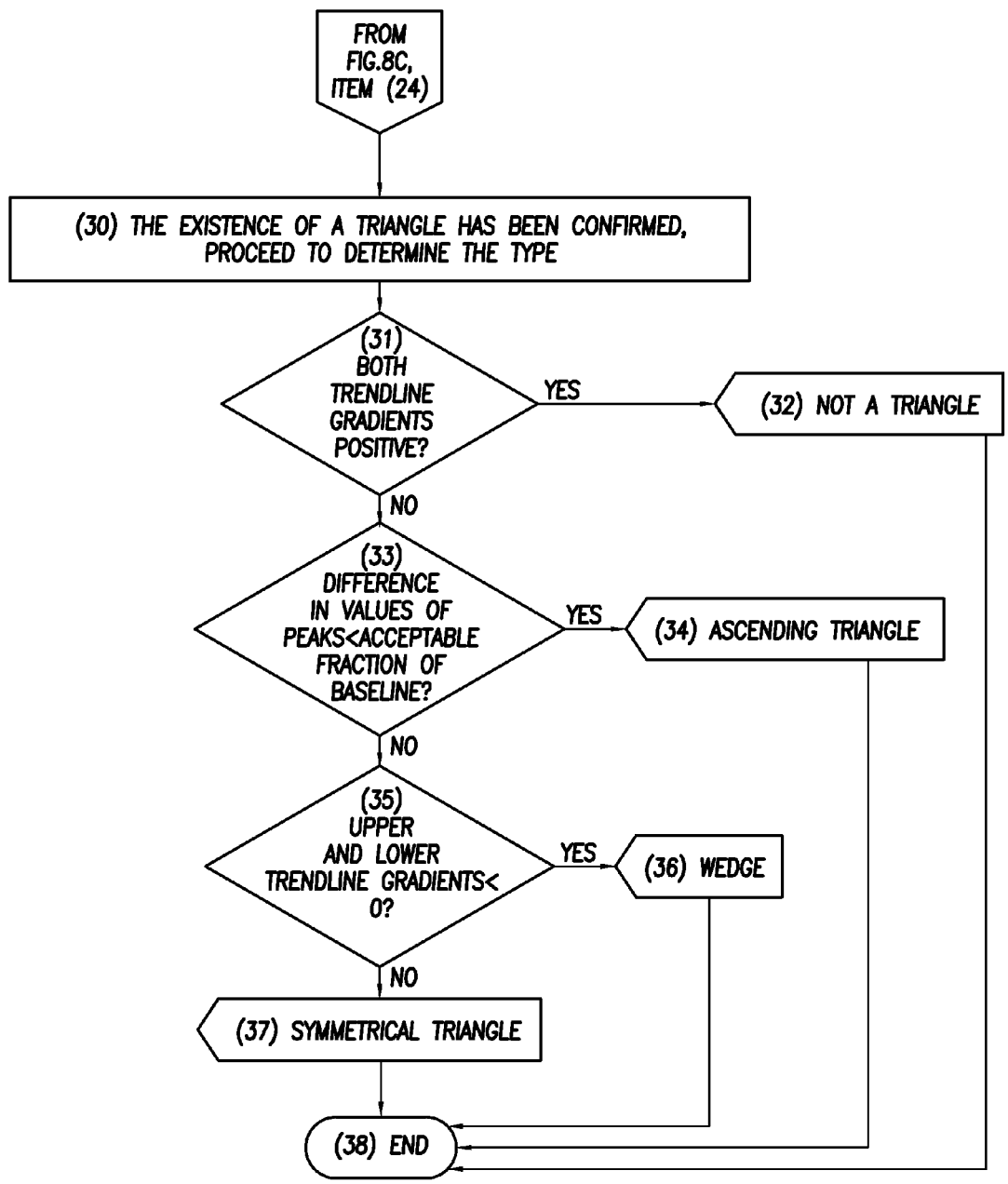

Thus according to the example of FIG. 7, pivot 9 is chosen as the initial current pivot. It is rejected since pivot 5 is larger. Accordingly, the pivot number is decremented by 2 and pivot 7 is chosen as the next current pivot. It too is rejected since pivot 5 is larger. Next pivot 5 is chosen as the current pivot and step 5 of FIG. 8A is satisfied since y(5) is the greatest pivot except for y(1). Next, the minimum between y(5) and y(1) occurs at y(4). The maximum between y(4) and y(1) occurs at y(3). Finally, the minimum between y(3) and y(1) occurs at y(2). Accordingly, pivots 1 to 5 of FIG. 7 correspond with the five extreme points of FIG. 6 and a triangle formation has been established.

We have illustrated the present invention with reference to a triangle having five pivot points. Of course, the method of the present invention is not restricted to give five-pivot triangles and can be extended to triangles having seven, nine or pivot points.

The present invention has been illustrated in the context of an example of recognizing a continuation triangle in a bull trend, but with mirror-imaged prices, the same algorithm can be used to recognize continuation triangles in bear trends. An analogous algorithm to recognize continuation triangles in bear trends could be similarly devised and used with mirror-imaged prices to recognize continuation triangles in bull trends.

Reversal Diamond

Figure 9:
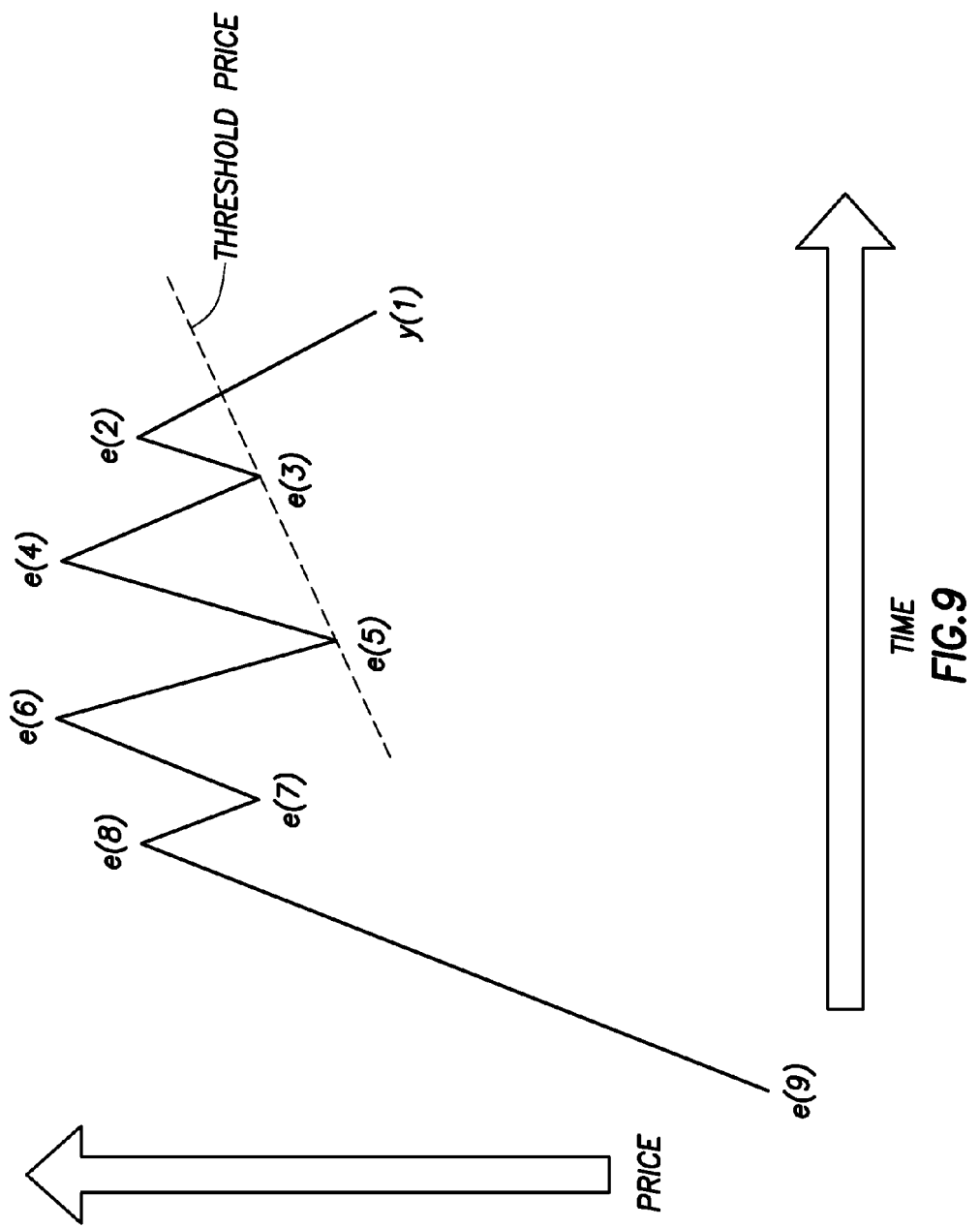
FIG. 9 illustrates a reversal diamond formation defined by nine extreme points.

We now consider the example of a nine point reversal diamond as illustrated in FIG. 9. We begin by noting that $e_1$ is the bottom of a fall. Accordingly, $e_1$ is a minimum.

The next extreme point of interest is $e_5$ which is the minimum in the interval $(e_1, p_n]$, if n is even, otherwise use the interval $(e_1, p_{n-1})$. $e_5$ is a "low".

Next, alternate maxima and minima are found on successive nested subintervals of $(e_1, e_5)$:

$e_4$ is the maximum in the subinterval $(e_1, p_{e5})$;
$e_3$ is the minimum in the subinterval $(e_1, p_{e4})$;
$e_2$ is the maximum in the subinterval $(e_1, p_{e3})$;

and alternate maxima and minima are found on successive nested subintervals of $(e_5, p_n]$:

$e_6$ is the maximum in the interval $(p_{e5}, pn)$;
$e_7$ is the minimum in the interval $(p_{e6}, pn)$;
$e_8$ is the maximum in the interval $(p_{e7}, pn]$, where $p_{ei}$ is the pivot point corresponding to extreme point $e_i$.

Each maximum of an interval must be a "high" and each minimum must be a "low". If no such extrema can be found as specified above, then the pattern match has failed and no such formation exists in the data under consideration. For example, if we are looking for a maximum and the interval is null (containing no pivot points) or contains only one "low" then no match is possible.

Of course, even if the pivot points match the extreme points of the formation of interest, additional validity conditions must be satisfied to recognize the formation. Examples of such validity conditions include: adequate prior trend, sufficient symmetry and enough price bars in the formation.

Figure 10A:
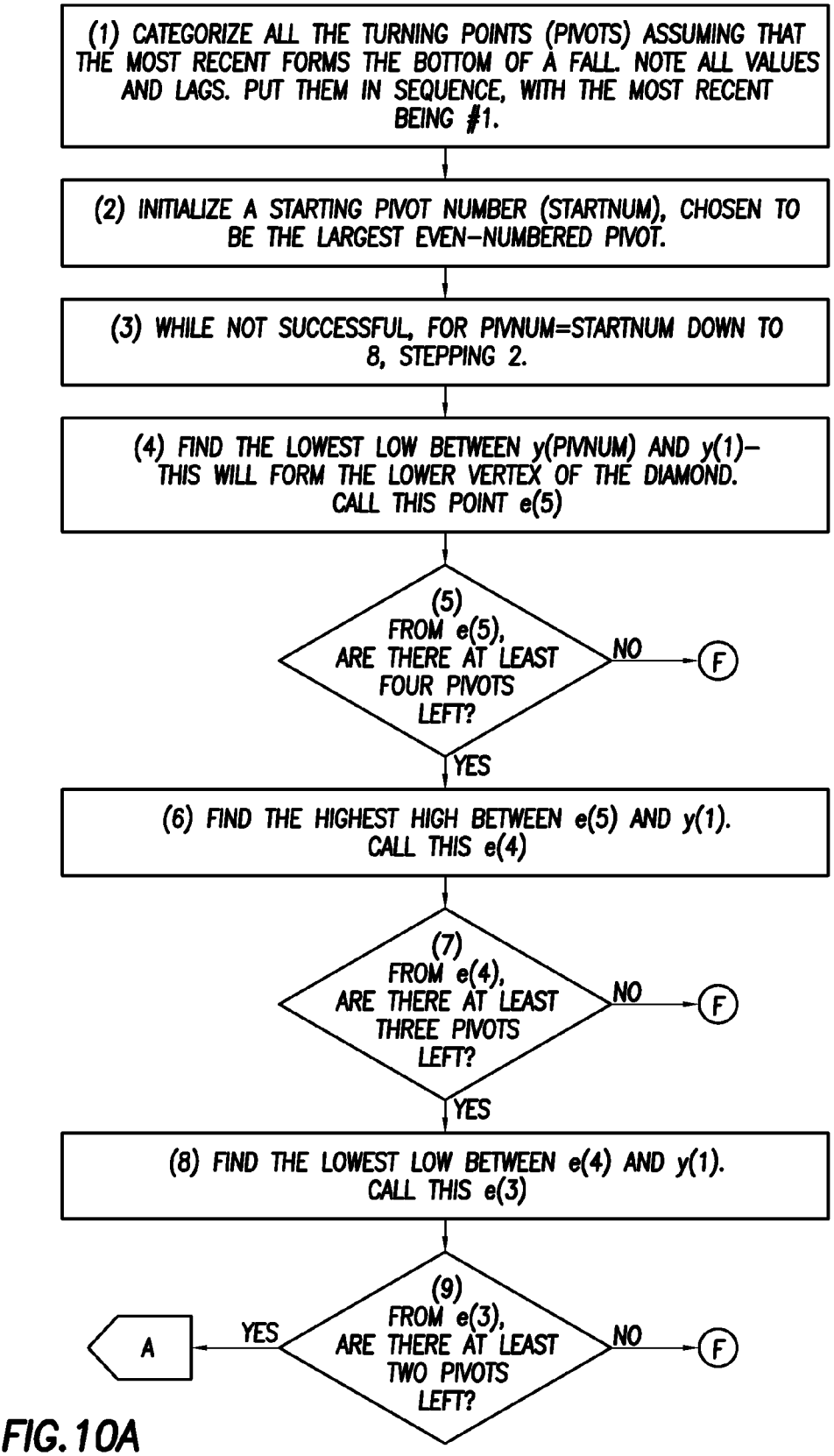
FIGS. 10A to 10D illustrate a flowchart showing the steps of reversal diamond formation recognition according to the present invention.
Figure 10B:
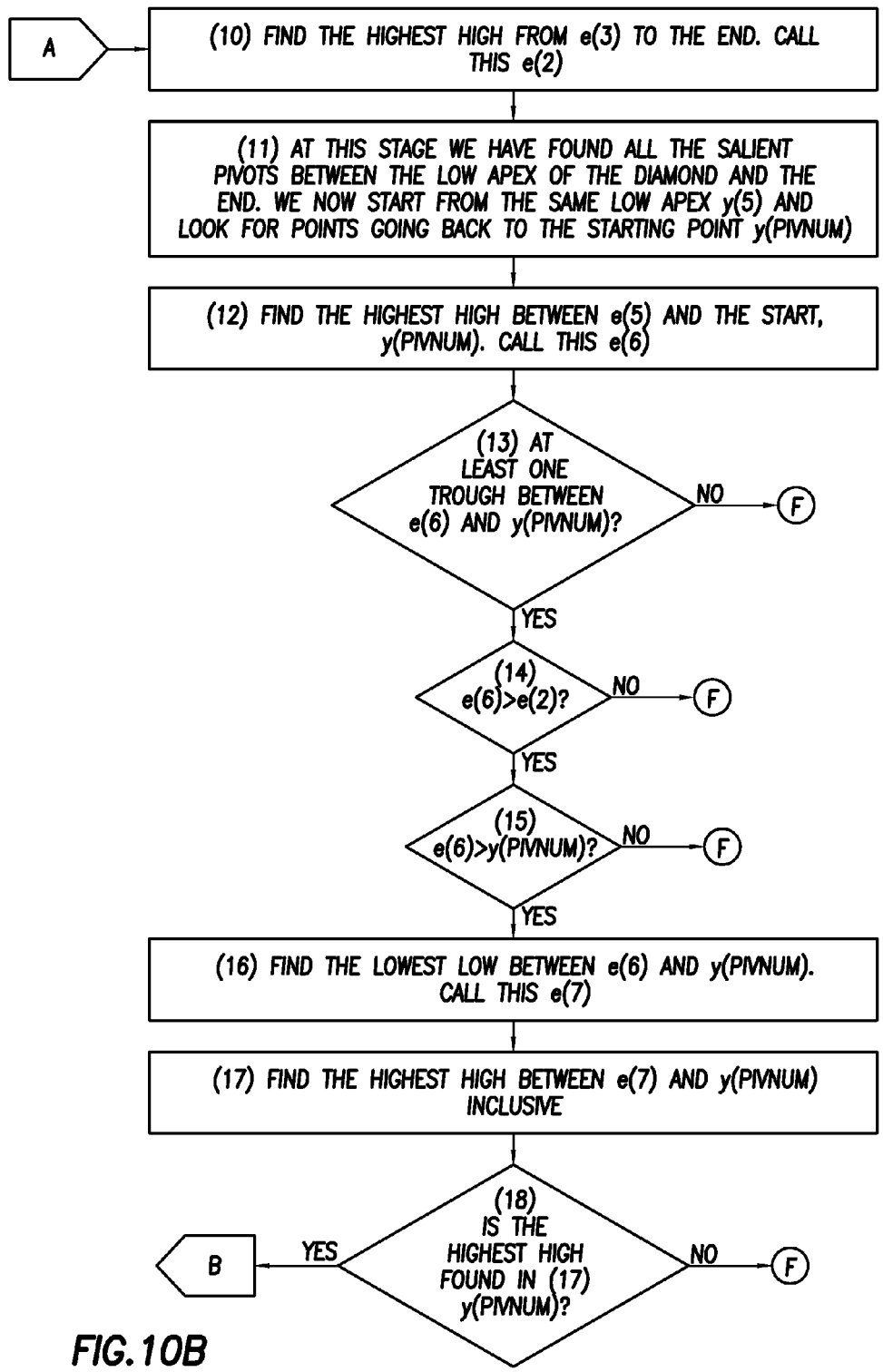
Figure 10C:
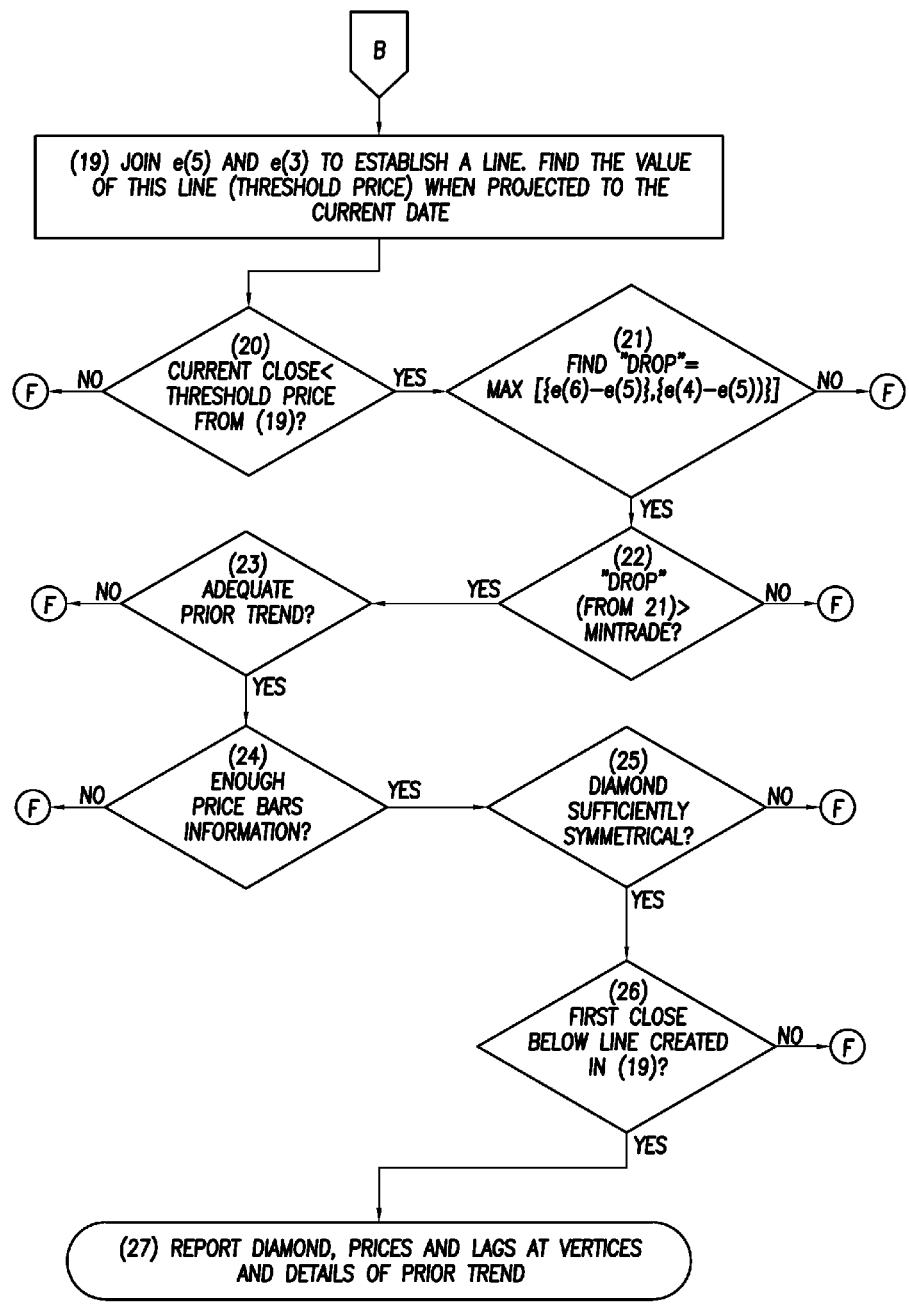
Figure 10D:
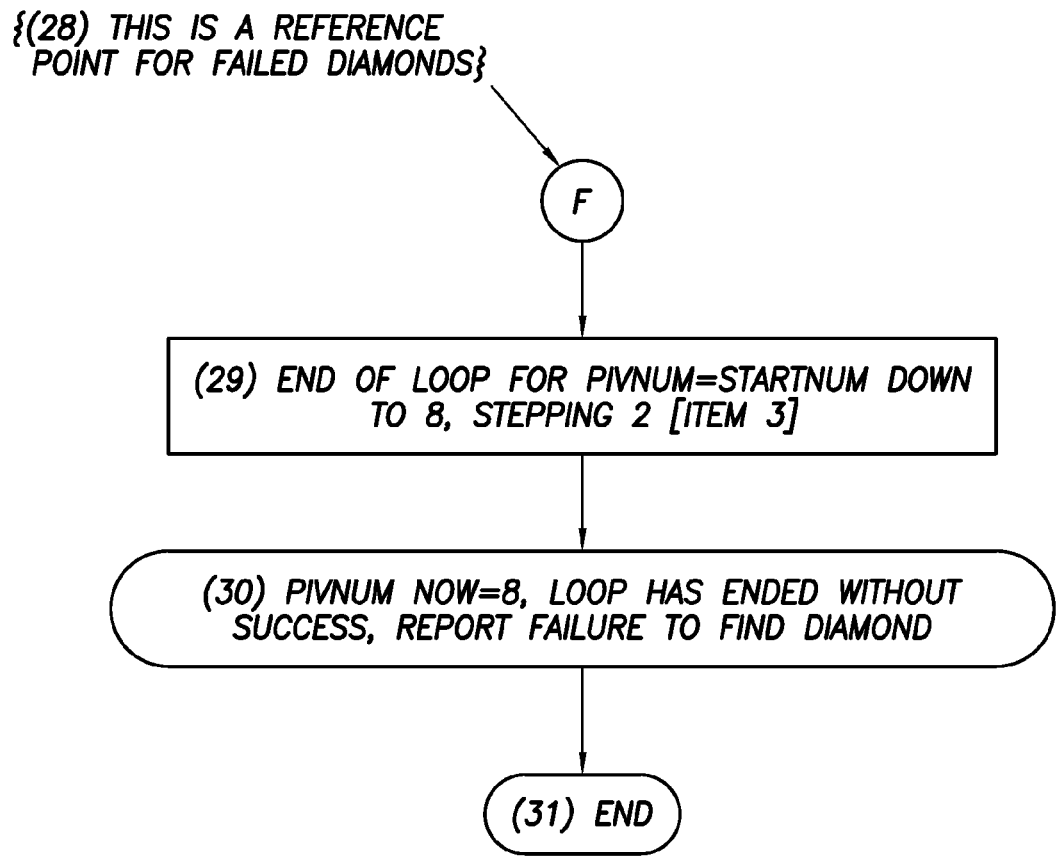

Referring to FIG. 10A, a specific example of the present invention applied to the formation recognition of a reversal diamond is provided. We begin with the identification of pivot points in raw data. Typically, a search period is defined and its pivots are categorised. The reversal diamond formation is exemplified by the pattern of FIG. 9, which is defined by the nine extreme points indicated. Reversal diamond formation recognition comprises matching the reversal diamond formation of FIG. 9 with the pivot points. It should be noted that by points we refer to points in a two dimensional space, for example, (x,y) coordinates, (time, y) or (time, price).). For reasons of brevity and clarity in the rest of this document, the convention is adopted whereby a statement such as y(1)=y(2) means that the point [x(1), y(1)] is coincident with the point [x(2), y(2)].

Referring to FIGS. 10A to 10D, over some pre-defined search interval, the price record is examined for "pivot" points. If this is done by the method of categorizing pivot points in technical analysis then the assumption is made that the right-most column of all point and figure charts used to find and categorize these pivots is downwards-facing; i.e. their right most columns consist of falling columns of 0's. Pivot points are numbered in reverse chronological order so that the most recent pivot point in time (right-most pivot) is number 1 (step 1). In consequence, high pivots are even numbered and low pivots odd numbered.

We begin the analysis by initially setting PivNum to be the number of the pivot that has been assigned the largest even number (step 2). Note that this is either the second or third left-most pivot. The process is an iterative one and generally proceeds from left to right focussing on the current datum pivot denoted by PivNum (step 3).

Next, we find the lowest low between y(PivNum) and y(1) (step 4). We refer to this low vertex as e(5) in FIG. 9 and this forms the lower vertex of the diamond formation.

In order for a valid reversal diamond formation to exist, there must be at least four pivot points to the right of e(5) (step 5) otherwise we can conclude that no reversal diamond exists (steps 28 to 31). In other words, if e(5) is pivot point 4 or less then there are not enough remaining pivot points for the formation to exist. Once this lower vertex peak has been found, according to the reversal diamond formation of FIG. 9, three further pivots to the left and three further pivots to the right need to be found to be consistent with the existence of a reversal diamond.

At step 6, we find the highest high between e(5) and y(1) and call this first right peak e(4). At this point, there must be three pivots remaining to the right of e(4) otherwise no reversal diamond can exist (step 7).

Next, the lowest low between e(4) and y(1) is found and we will call this right trough e(3) (step 8). There must be two pivot points to the right of e(3) (step 9).

We then find the highest high between e(3) and y(1) and we call this second right peak e(2) (step 10)). At step 11, all the pivots between lower vertex e(5) and the end y(1) have been located and the remaining pivots to the left of lower vertex e(5) should now be found.

At step 12, we find the highest high between e(5) and y(PivNum) and we label this first left peak e(6). There must be at least one trough between e(6) and y(PivNum) (step 13).

The point e(6) must be higher than e(2) and y(PivNum) for a valid reversal diamond formation and this determination is made at steps 14 and 15.

Next, we find left trough e(7) which is the lowest low between e(6) and y(PivNum) (step 16). At step 17, we find the highest high from e(7) up to and including y(PivNum). This is the second left peak. For a reversal diamond formation, the second left peak found in step 17 must be y(PivNum) and this determination is made in step 18.

If so, then additional criteria must be satisfied for a valid reversal diamond formation. In step 19, points e(5) and e(3) are used to establish a line. The value of this line when projected to the current date gives the threshold price. Referring to step 20, the current close must be less than the threshold price.

In step 21, we define "drop" to be the larger of the vertical separation from e(6) to e(5) and e(4) to e(5). Referring to step 22, the drop must be greater than the minimum trade (MinTrade). In one manifestation, the value of MinTrade is arranged to be the product of a parameter and noise estimate, which means that the formation can only be classified as genuine if sufficiently distinct from prevailing market noise. Next, at step 23, we ensure that there has been adequate prior trend. The prior trend is defined as a multiple of the drop. If the product of a prior trend parameter (e.g. 1.5) and the drop is exceeded by the price rise from e(9) to e(8), the prior trend is assumed to be adequate.

At step 24, we ensure that there are enough price bars in the formation. At step 25, we ensure that the reversal diamond formation is sufficiently symmetrical. There are a number of symmetry tests, which are currently based on price rather than time. There is a symmetry ratio parameter (set, for example, to 0.3) which is used in conjunction with prices annotated in the diagrams as follows:

a) [e(2)−e(3)]/[e(4)−e(5)]>symmetry ratio
b) [e(8)−e(7)]/[e(6)−e(4)]>symmetry ratio In addition, there are conditions for the top vertices:
c) |e(6)−e(4)|<|e(4)−e(2)|
d) |e(6)−e(4)|<|e(6)−e(8)|

Similar conditions could also apply for the bottom vertices.

If the first close is below the line of step 19, then a reversal diamond formation has been found and the formation is reported along with prices, tags at vertices and details of the prior trend.

We have illustrated the present invention with reference to a reversal diamond having nine pivot points. Of course, the method of the present invention is not restricted to give nine-pivot reversal diamonds and can be extended to reversal diamonds having 11, 13 or more pivot points.

The present invention has been illustrated in the context of an example of recognizing a reversal diamond formation in a bull trend, but with mirror-imaged prices, the same algorithm can be used to recognize reversal diamond formations in bear trends. An analogous algorithm to recognize reversal diamonds in bear trends could be similarly devised and used with mirror-imaged prices to recognize reversal diamonds in bull trends.

Although the examples discussed above refer to the use of pivot points, the present invention is also applicable to data points including price bars and raw data. The advantage of pivot points is that they identify the occurrence of relevant events where trends reverse or turn around. The present method can, with minor modification, be used on data points. However, this is not as efficient as the application of the present invention to pivot points since there is no guarantee that subsequent data points are alternate highs and lows. Thus, although more processing will be required to identify the data points which may exist corresponding to a formation of interest, it is certainly possible and within the scope of the present invention.

In the illustrative examples discussed, we have matched the first pivot point with the first extreme point. We have done this as a convenience for the sake of simplifying the examples. In practice, this approach may not be problematic since a typical investor or analyst is interested in formations based on the most current data, not on past data. It is, of course, fully contemplated that the invention includes consideration of later pivot points as the first extreme point. For example, it is straightforward to reapply the method of the present embodiment to pivot points omitting one or more rightmost (most recent) pivot points to determine if a formation exists starting with any earlier pivot point. Symmetrically if additional (later) pivot points are to be considered.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of identifying a recognized formation in a predetermined interval of a financial event data time series from a plurality of established formations, each of the plurality of established formations defined by a respective sequence of alternating high and low extremums, the method comprising:

categorizing, using a computer, a plurality of pivot points corresponding to a first box size within the predetermined interval, wherein the plurality of pivot points is ordered in a reverse chronological order;

matching, using the computer, a first pivot point of the plurality of pivot points to a first extremum of the alternating high and low extremums of the one of the plurality of established formations;

determining a first interval based on the first extremum and a number of the plurality of pivot points;

establishing, using the computer, a first polarity of the first interval based on a second extremum of the alternating high and low extremums of the one of the plurality of established formations;

matching, using the computer, a second polarity of a second pivot point of the plurality of pivot points to the first polarity of the first interval, wherein the second pivot point is in the first interval;

determining a second interval based on the first extremum and the second pivot point;

establishing, using the computer, a third polarity of the second interval based on a third extremum of the alternating high and low extremums of the one of the plurality of established formations;

matching, using the computer, a fourth polarity of a third pivot point of the plurality of pivot points to the third polarity of the second interval, wherein the third pivot point is in the second interval; and recognizing and presenting the one of the plurality of established formations in the plurality of pivot points based on, at least, matching the first pivot point, the second pivot, and the third pivot point.

2. The method of claim 1, wherein categorizing the plurality of pivot points comprises numbering the first plurality of pivot points.

3. The method of claim 1, wherein the one of the plurality of established formations is a continuation triangle formation.

4. The method of claim 1, wherein the one of the plurality of established formations is a reversal diamond formation.

5. The method of claim 1, wherein matching the first point, the second point, and the third point of the plurality of pivot points to the alternating high and low extremums for the one of the plurality of established formations is subject to satisfaction of a validity condition.

* * * * *